United States Patent
Jeon et al.

(10) Patent No.: US 12,120,652 B2
(45) Date of Patent: Oct. 15, 2024

(54) METHOD FOR TRANSMITTING OR RECEIVING SIGNAL IN WIRELESS COMMUNICATION SYSTEM, AND DEVICE FOR SUPPORTING SAME

(71) Applicant: LG ELECTRONICS INC., Seoul (KR)

(72) Inventors: Kijun Jeon, Seoul (KR); Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 507 days.

(21) Appl. No.: 17/421,216

(22) PCT Filed: Jan. 8, 2019

(86) PCT No.: PCT/KR2019/000275
§ 371 (c)(1),
(2) Date: Jul. 7, 2021

(87) PCT Pub. No.: WO2020/145422
PCT Pub. Date: Jul. 16, 2020

(65) Prior Publication Data
US 2022/0070864 A1    Mar. 3, 2022

(51) Int. Cl.
*H04W 72/04* (2023.01)
*H04W 72/0453* (2023.01)

(52) U.S. Cl.
CPC ............................. *H04W 72/0453* (2013.01)

(58) Field of Classification Search
CPC ..... H04W 72/0453; H04L 5/001; H04L 5/003
See application file for complete search history.

(56) References Cited

U.S. PATENT DOCUMENTS

2002/0151289 A1* 10/2002 Rahman ................ H03D 3/006
                                                          455/234.1
2016/0099823 A1    4/2016 Barrami
(Continued)

FOREIGN PATENT DOCUMENTS

WO    2018-196996    11/2018

OTHER PUBLICATIONS

Azim, Ali W. et al., "Hermitian symmetry free optical-single-carrier frequency division multiple access for visible light communication," Optics Communications vol. 415, pp. 177-185, May 15, 2018, See sections 2.2, 2.4; and figures 1-2.

(Continued)

*Primary Examiner* — Jamal Javaid
(74) *Attorney, Agent, or Firm* — BRYAN CAVE LEIGHTON PAISNER LLP

(57) ABSTRACT

The present specification provides a method for transmitting a signal in a wireless communication system. More specifically, the method performed by a transmission terminal comprises the steps of: generating at least one bit into a complex symbol by using a modulation scheme; mapping the complex symbol to subcarriers each having an even index or subcarriers each having an odd index among subcarriers of at least one configured resource block; performing IFFT on the subcarriers to which the complex symbol is mapped, in order to generate a time-continuous signal; performing a DC bias on the time-continuous signal; and transmitting the DC biased signal.

10 Claims, 15 Drawing Sheets

(56) References Cited

U.S. PATENT DOCUMENTS

2016/0330000 A1* 11/2016 Lee ................... H04L 5/0007
2017/0251493 A1* 8/2017 Zhang ................ H04W 56/001

OTHER PUBLICATIONS

Chen, Chen et al., "Communication Coverage Improvement of Indoor SDM-VLC System Using NHS-OFDM with a Modified Imaging Receiver," IEEE ICC2016—Workshops; W02—Second Workshop on Optical Wireless Communications, May 31, 2016, See section II.B; and figure 2.

Sanya, M.F., et al., "DC-biased optical OFDM for IM/DD passive optical network systems," Journal of Optical Communications and Networking vol. 7, Issue 4, pp. 205-214, 2015, See section II.B; and figures 3-4.

* cited by examiner

[FIG. 1]
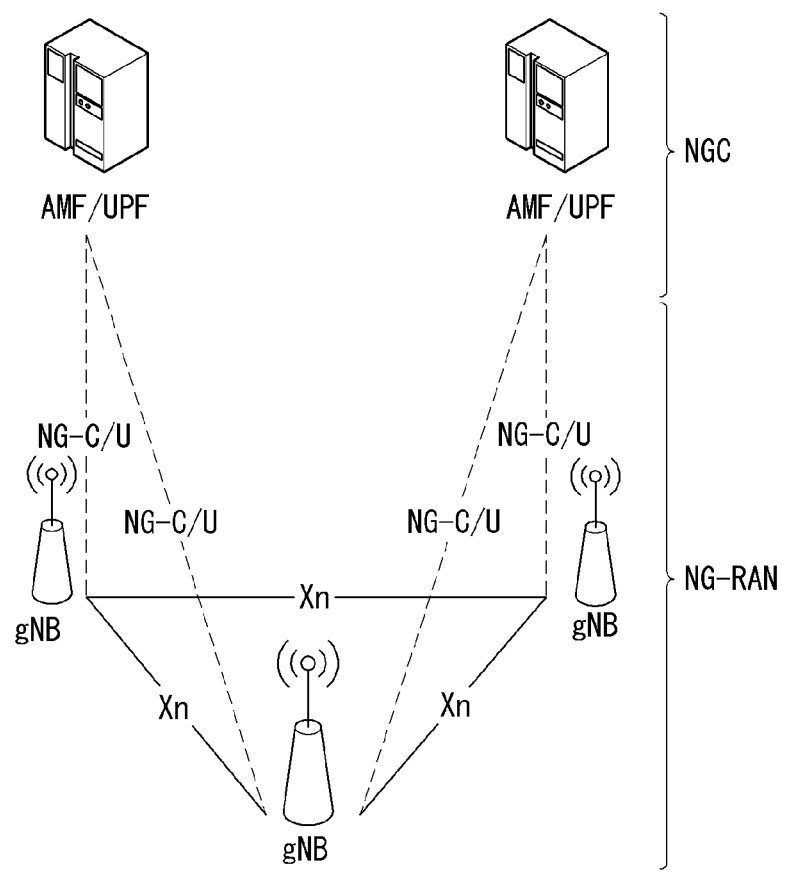

[FIG. 2]
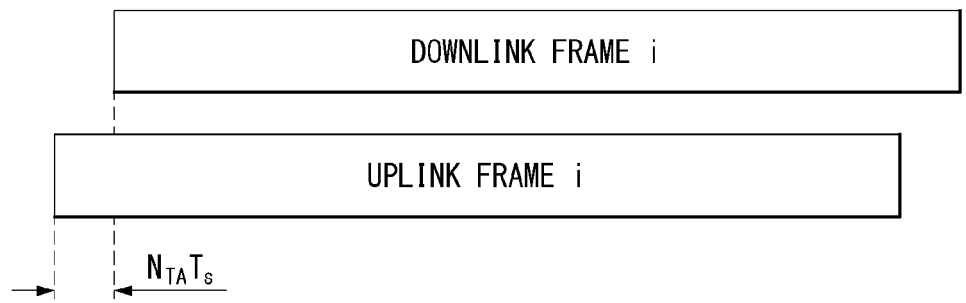

[FIG. 3]
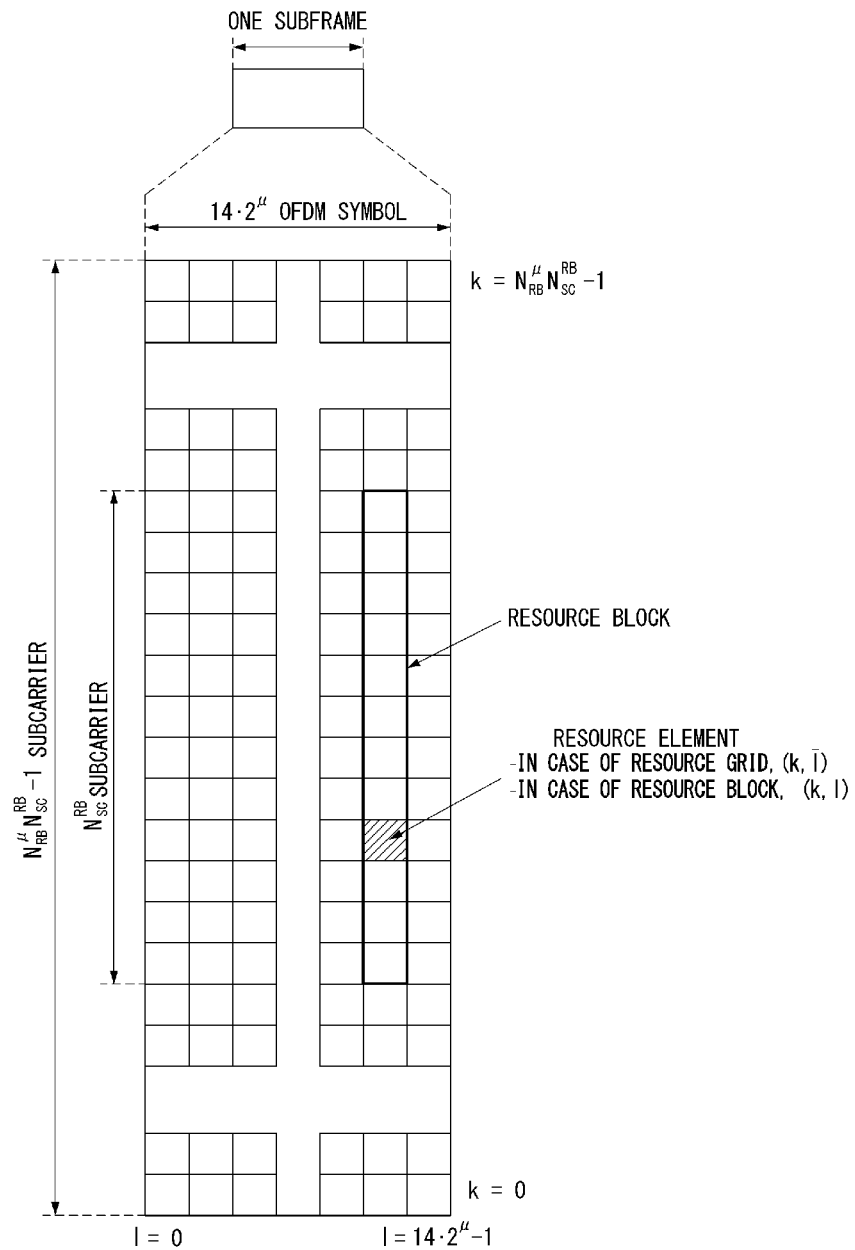

[FIG. 4]
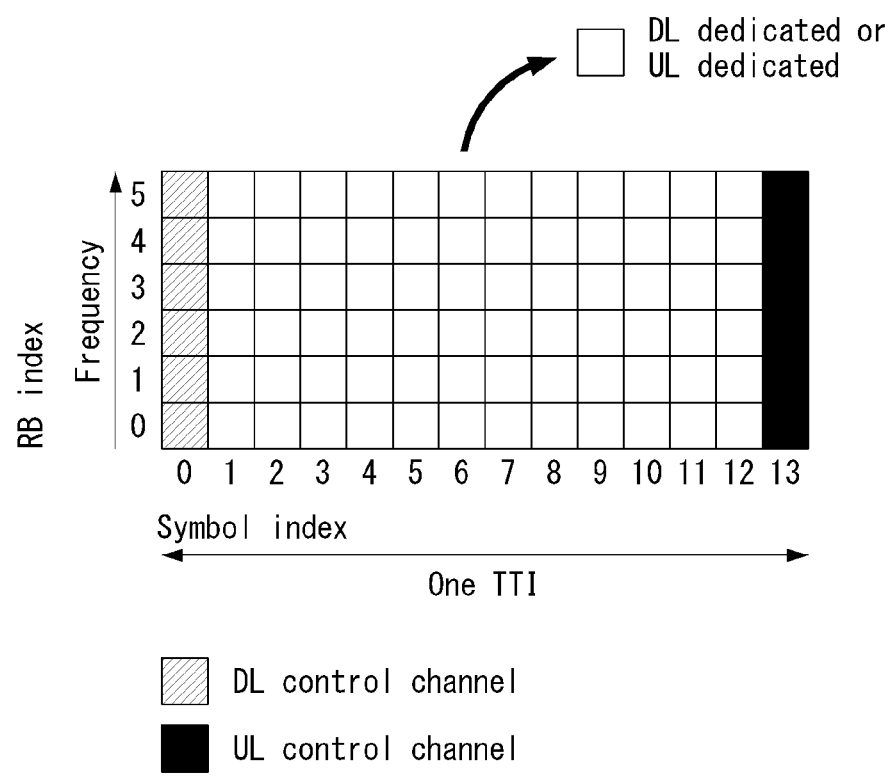

[FIG. 5]
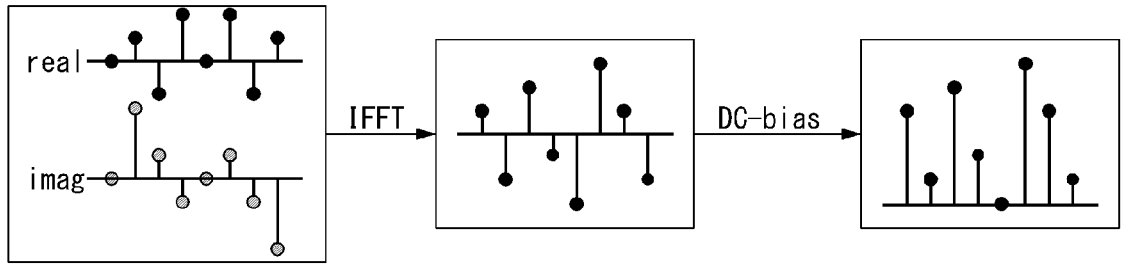
(a)
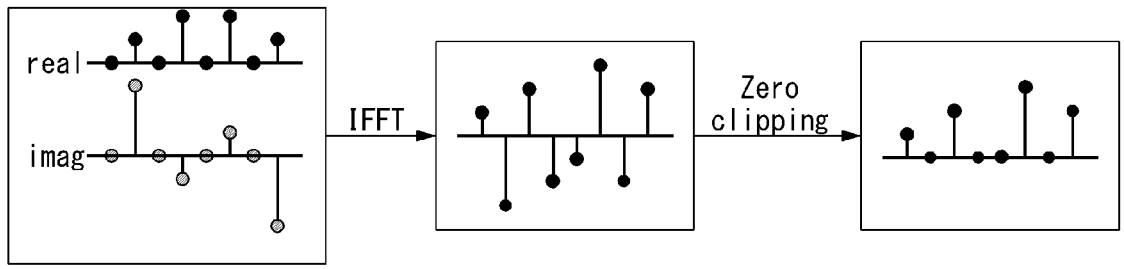
(b)
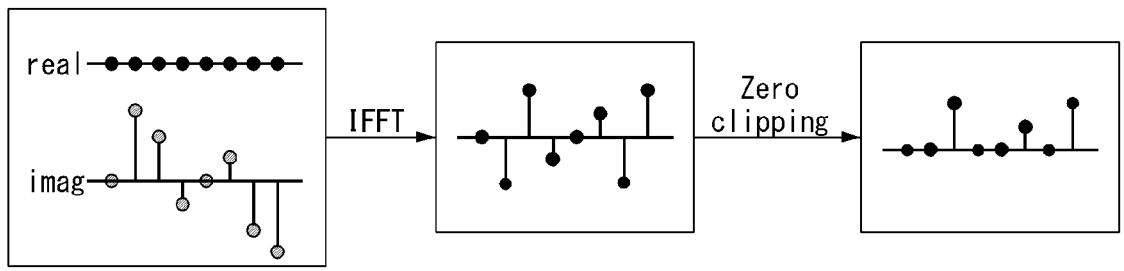
(c)

[FIG. 6]
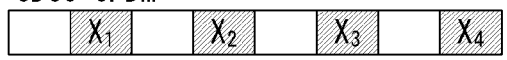
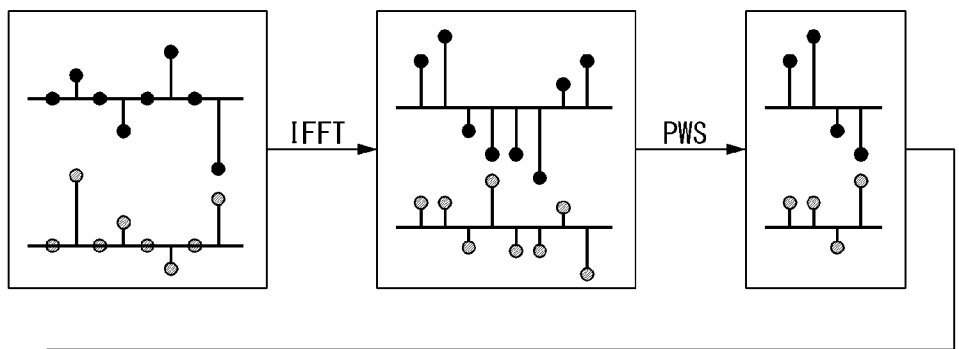
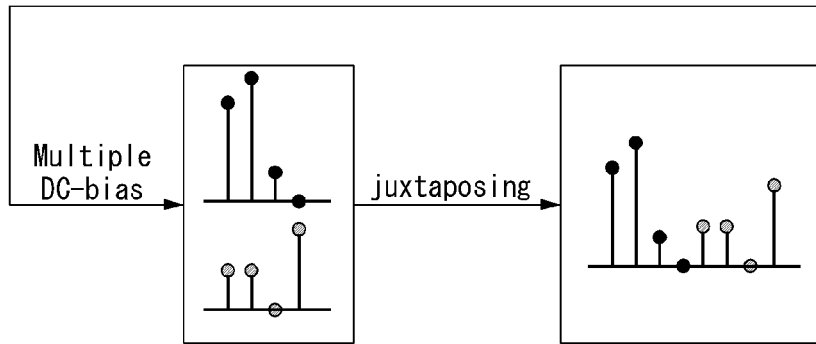

[FIG. 7]
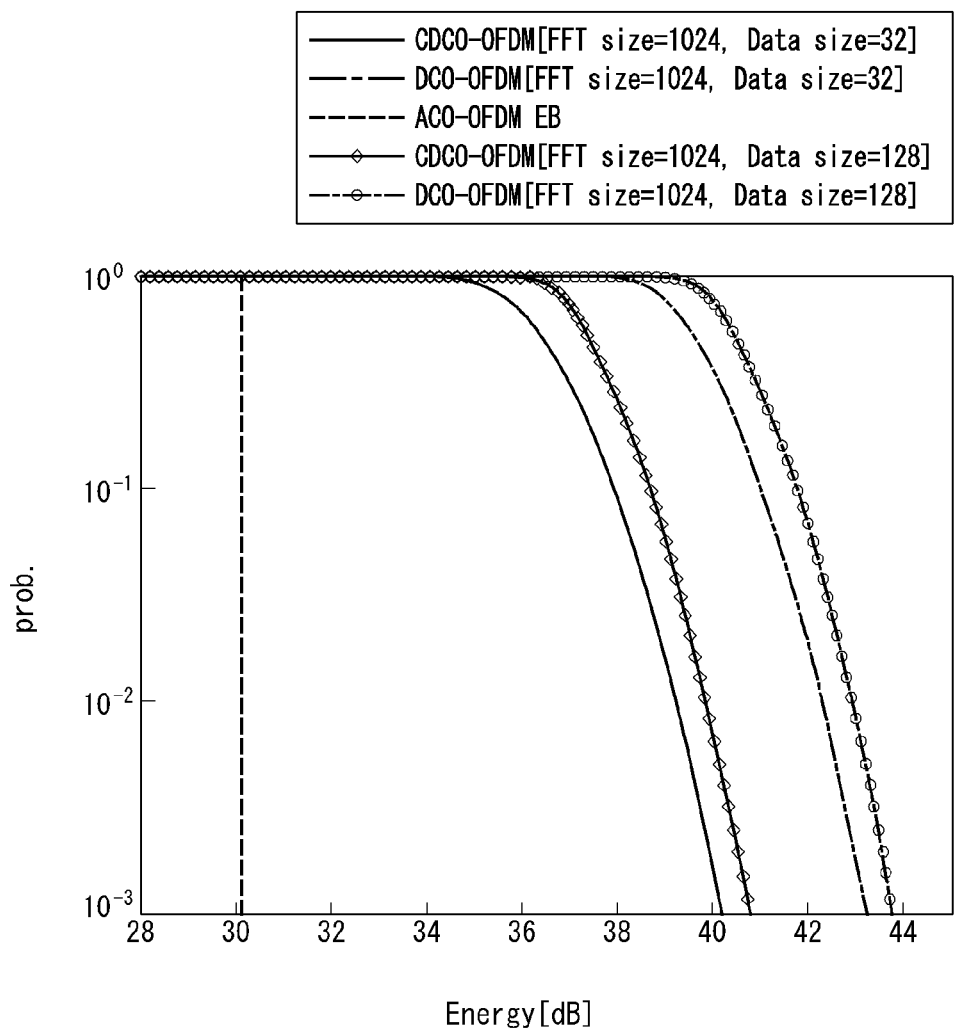

[FIG. 8]
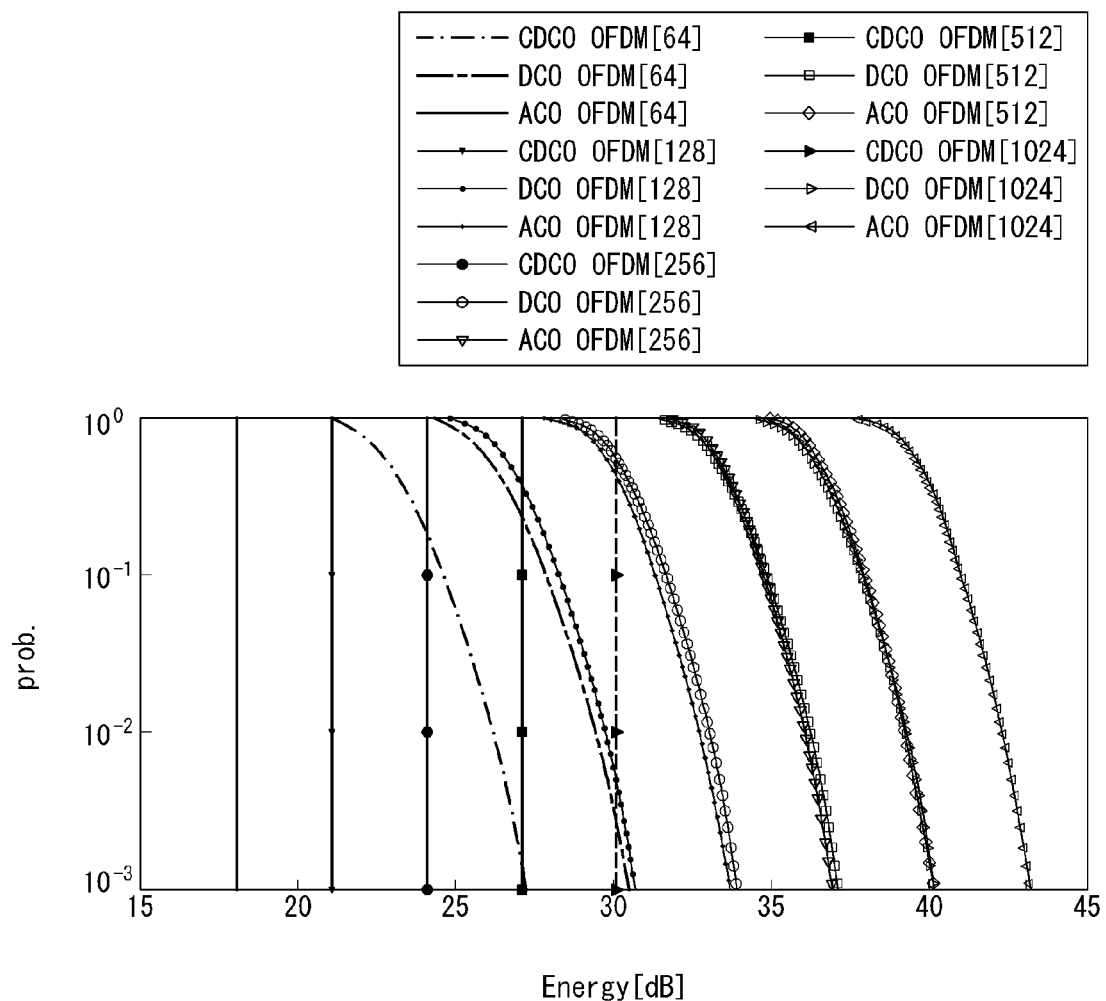

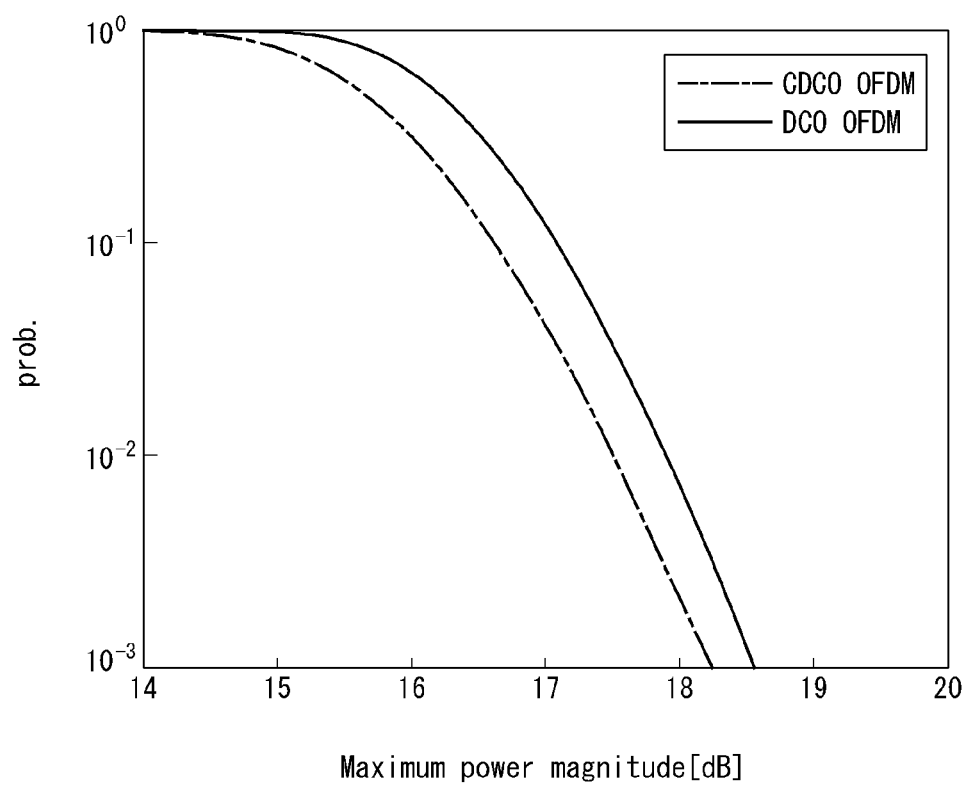
[FIG. 9]

[FIG. 10]

| Resource allocation method | CDCO-OFDM | DCO-OFDM | ACO-OFDM |
|---|---|---|---|
| | Available | Available | Available |
| | Available | Available | Available |
| | Available | Not available | Not available |
| | Available | Not available | Not available |

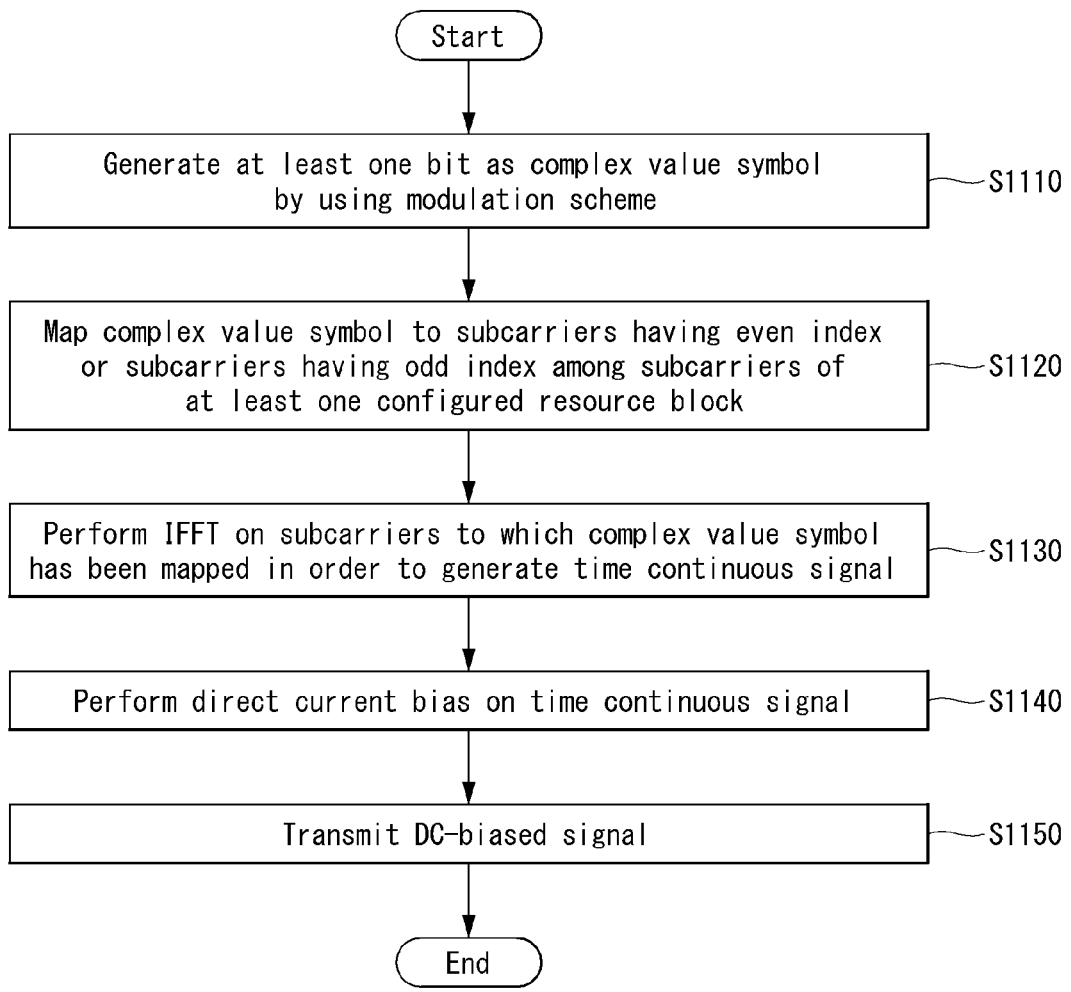

[FIG. 12]
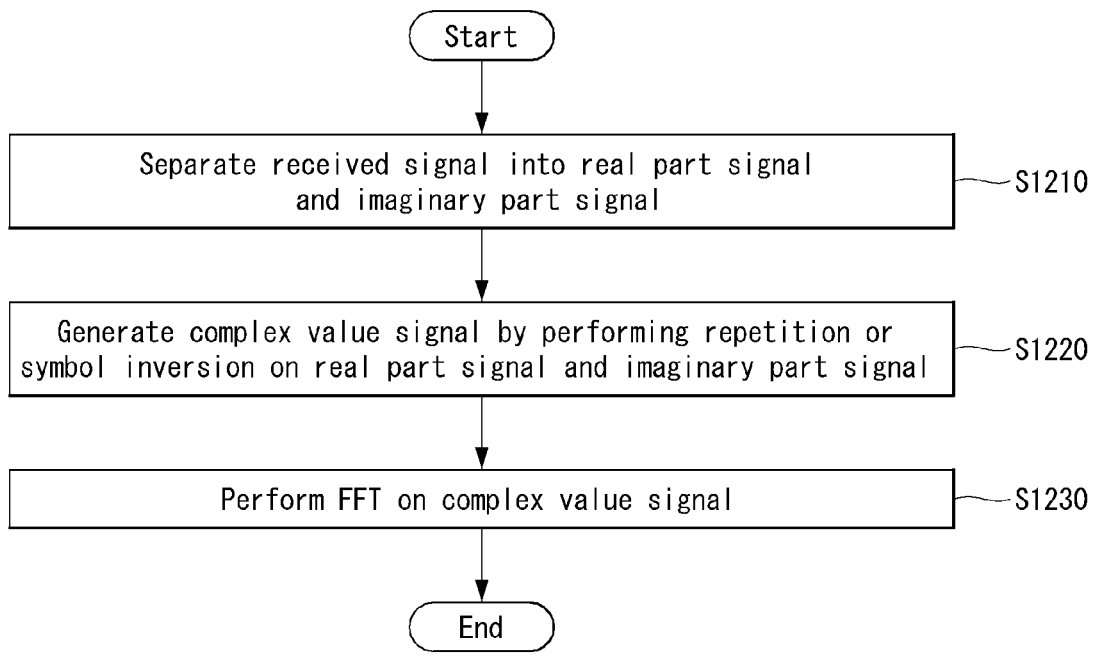

[FIG. 13]
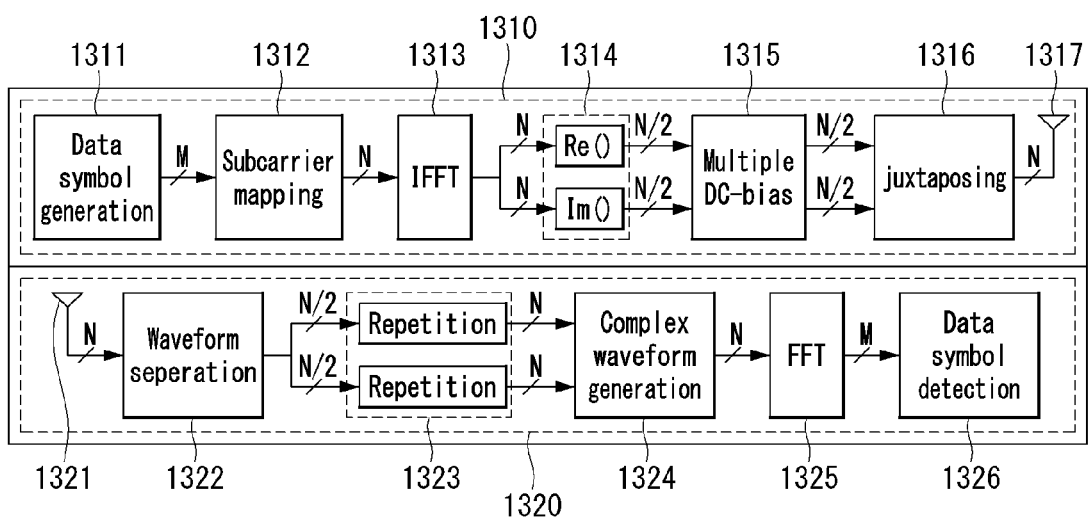

[FIG. 14]
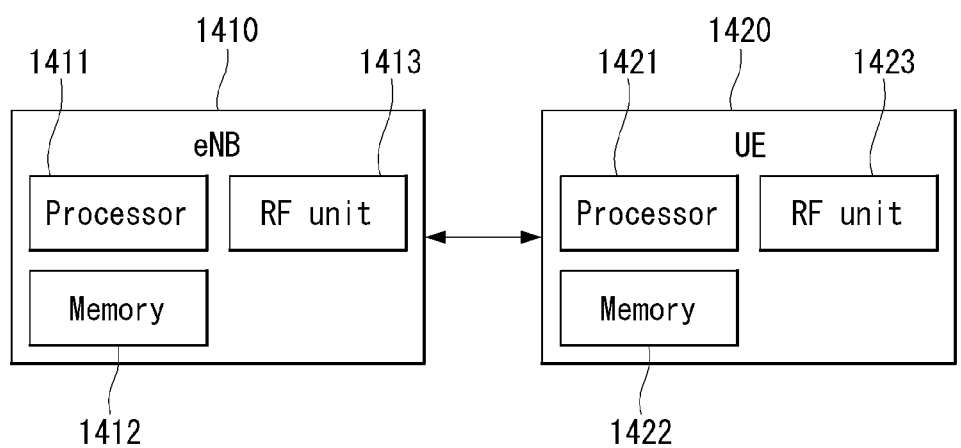

[FIG. 15]
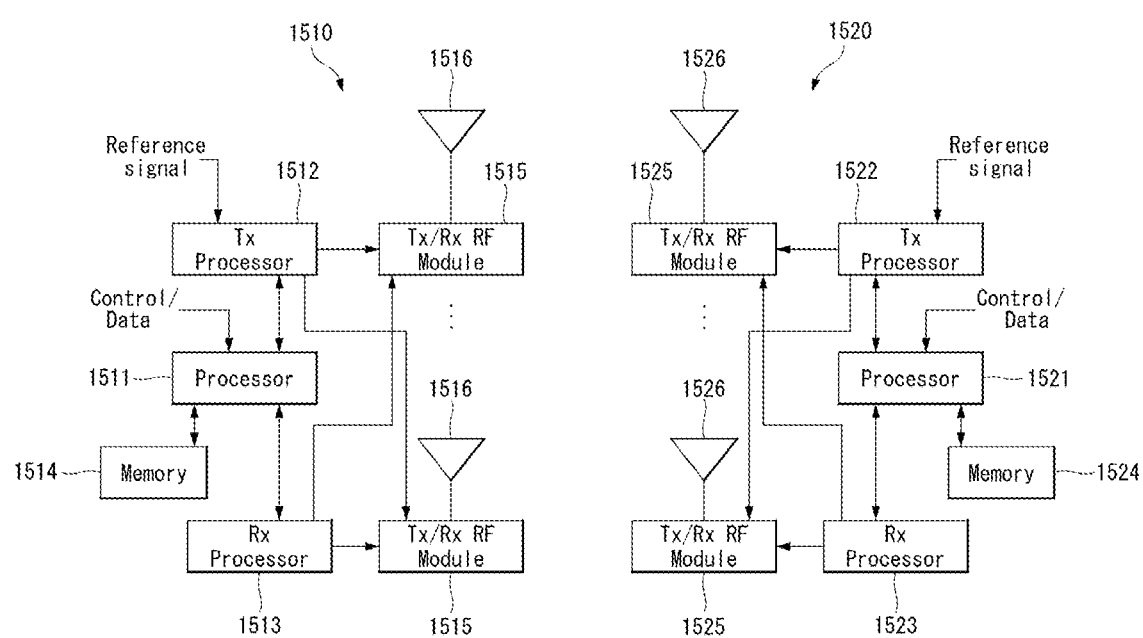

METHOD FOR TRANSMITTING OR RECEIVING SIGNAL IN WIRELESS COMMUNICATION SYSTEM, AND DEVICE FOR SUPPORTING SAME

This application is the National Stage filing under 35 U.S.C. 371 of International Application No. PCT/KR2019/000275 filed on Jan. 8, 2019, the contents of which is hereby incorporated by reference herein in its entirety.

TECHNICAL FIELD

The present disclosure relates to a method for transmitting and receiving signals, and more particularly, to a method for transmitting and receiving signals by using a complex DC-biased optical (CDCO) OFDM method and an apparatus for the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present disclosure is directed to providing the definition of a multi carrier modulation (MCM) waveform for visible light communication (VLC) and a method for transmitting and receiving signals using the same.

Technical objects of the disclosure are not limited to the above-described technical objects, and other technical objects not described above may be evidently understood by those skilled in the art to which the disclosure pertains from the following description.

Technical Solution

In a method of transmitting a signal in a wireless communication system, the method performed by a transmission stage includes generating at least one bit as a complex value symbol by using a modulation scheme, mapping the complex value symbol to subcarriers having an even index or subcarriers having an odd index among subcarriers of at least one configured resource block (RB), performing an inverse fast Fourier transform (IFFT) on the subcarriers to which the complex value symbol has been mapped in order to generate a time continuous signal, performing a direct current (DC) bias on the time continuous signal, and transmitting the DC-biased signal.

Furthermore, in the present disclosure, the time continuous signal includes a first real part signal and a first imaginary part signal.

Furthermore, the present disclosure further includes selecting a partial signal in each of the first real part signal and the first imaginary part signal, and generating a second real part signal and a second imaginary part signal.

Furthermore, in the present disclosure, performing the DC bias includes applying a first value and a second value to the second real part signal and the second imaginary part signal, respectively.

Furthermore, in the present disclosure, the first value is a minimum value of the second real part signal, and the second value is a minimum value of the second imaginary part signal.

Furthermore, the present disclosure further includes juxtaposing the second real part signal and the second imaginary part signal on which the DC bias has been performed.

Furthermore, in the present disclosure, in the partial signal, the part is ½.

Furthermore, in the present disclosure, each of the second real part signal and the second imaginary part signal on which the DC bias has been performed is a real value signal.

Furthermore, in a method of receiving a signal in a wireless communication system, the method performed by a reception stage includes separating the signal into a real part signal and an imaginary part signal, generating a complex value signal through repetition or symbol inversion for each of the real part signal and the imaginary part signal, and performing a fast Fourier transform (FFT) on the complex value signal in order to detect a modulation symbol corresponding to at least one bit.

Furthermore, a transmission stage for transmitting a signal in a wireless communication system according to the present disclosure includes a radio frequency (RF) module for transmitting and receiving radio signals and a processor configured to control the RF module. The processor is configured to generate at least one bit as a complex value symbol by using a modulation scheme, map the complex value symbol to subcarriers having an even index or subcarriers having an odd index among subcarriers of at least one configured resource block (RB), perform an inverse fast Fourier transform (IFFT) on the subcarriers to which the complex value symbol has been mapped in order to generate a time continuous signal, perform a direct current (DC) bias on the time continuous signal, and transmit the DC-biased signal.

Advantageous Effects

There are effects in that optimum spectral efficiency (SE) is guaranteed and half energy consumption, a better maximum power amplitude characteristic, and a degree of freedom for resource allocation can be provided compared to the existing MCM scheme through the method of transmitting and receiving signals using the CDCO-OFDM method proposed in the present disclosure.

Effects of the disclosure are not limited to the above-described effects, and other technical effects not described above may be evidently understood by those skilled in the art to which the disclosure pertains from the following description.

DESCRIPTION OF DRAWINGS

The accompanying drawings, which are included herein as a part of a description in order to help understanding of the disclosure, provide embodiments of the disclosure, and describe the technical features of the disclosure with the description below.

FIG. 1 illustrates an example of an overall structure of a new radio (NR) system to which a method proposed by the disclosure may be implemented.

FIG. 2 illustrates a relationship between a uplink (UL) frame and a downlink (DL) frame in a wireless communication system to which a method proposed by the disclosure may be implemented.

FIG. 3 illustrates an example of a resource grid supported in a wireless communication system to which a method proposed by the disclosure may be implemented.

FIG. 4 is a diagram illustrating one example of a self-contained slot structure to which the method proposed in the present specification may be applied.

FIGS. 5(a)-(c) are diagrams illustrating an example of a modulation symbol subcarrier mapping method in a frequency domain and signals in a time domain for the existing MCM schemes.

FIG. 6 is a diagram illustrating an example of subcarrier mapping in a frequency domain and waveforms in a time domain in a CDCO-OFDM method proposed in the present disclosure.

FIG. 7 is a diagram illustrating a performance comparison between CCDFs of transmitted energy depending on an information size given as an FFT size of 1024 with respect to CDCO-OFDM, DCO-OFDM, and ACO-OFDM energy bounds.

FIG. 8 is a diagram illustrating a performance comparison between CCDFs of transmitted energy depending on an information size of 32 with respect to CDCO-OFDM, DCO-OFDM, and ACO-OFDM energy bounds.

FIG. 9 is a diagram illustrating a performance comparison between CCDFs having a maximum power size given as an FFT size of 1024 and a data size of 400 with respect to CDCO-OFDM and DCO-OFDM.

FIG. 10 illustrates an example of a resource allocation comparison between CDCO-OFDM, DCO-OFDM, and ACO-OFDM.

FIG. 11 is a flowchart illustrating an example of an operating method of a transmission stage for transmitting a signal, which is proposed in the present disclosure.

FIG. 12 is a flowchart illustrating an example of an operating method of a reception stage for receiving a signal, which is proposed in the present disclosure.

FIG. 13 is a diagram illustrating an example of a structure of the transmission and reception stages for implementing the CDCO-OFDM method, which is proposed in the present disclosure.

FIG. 14 illustrates a block diagram of a wireless communication apparatus to which methods proposed in the present disclosure may be applied.

FIG. 15 is another example of a block diagram of a wireless communication apparatus to which methods proposed in the present disclosure may be applied.

MODE FOR INVENTION

Some embodiments of the disclosure are described in detail with reference to the accompanying drawings. A detailed description to be disclosed along with the accompanying drawings is intended to describe some exemplary embodiments of the disclosure and is not intended to describe a sole embodiment of the disclosure. The following detailed description includes more details in order to provide full understanding of the disclosure. However, those skilled in the art will understand that the disclosure may be implemented without such more details.

In some cases, in order to avoid making the concept of the disclosure vague, known structures and devices are omitted or may be shown in a block diagram form based on the core functions of each structure and device.

In the disclosure, a base station has a meaning as a terminal node of a network that directly communicates with a terminal. In this document, a specific operation described as being performed by the base station may be performed by an upper node of the base station in some cases. That is, it is apparent that various operations performed for communication with the terminal in the network constituted by multiple network nodes including the base station may be performed by the base station or network nodes other than the base station. A 'base station (BS)' may be replaced with terms including a fixed station, a Node B, an evolved-NodeB (eNB), a base transceiver system (BTS), an access point (AP), a next generation NB, general NB, gNodeB (gNB), and the like. Further, a 'terminal' may be fixed or mobile and may be replaced with terms including a mobile station (UE), a mobile station (MS), a user terminal (UT), a mobile subscriber station (MSS), a subscriber station (SS) Advanced Mobile Station (WT), a Wireless Terminal (WT), a Machine-Type Communication (MTC) device, a Machine-to-Machine (M2M) device, and a Device-to-Device (D2D) device, and the like.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the disclosure, and the use of such specific terms may be changed in various forms without departing from the technical sprit of the disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the disclosure may be supported by the standard documents disclosed in at least one of IEEE 802, 3GPP, and 3GPP2, that is, radio access systems. That is, steps or portions that belong to the embodiments of the disclosure and that are not described in order to clearly expose the technical spirit of the disclosure may be supported by the documents. Furthermore, all terms disclosed in this document may be described by the standard documents.

In order to more clarify a description, 3GPP LTE/LTE-A is chiefly described, but the technical characteristics of the disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface.
Overview of System

FIG. 1 is a diagram illustrating an example of an overall structure of a new radio (NR) system to which a method proposed by the disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.
New Rat (NR) Numerology and Frame Structure In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | Δf = 2^μ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

In the embodiments of the disclosure, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB. Regarding a frame structure in the NR system, a size of various fields in the time domain is expressed as a multiple of a time unit of $T_s=1/(\Delta f_{max} \cdot N_f)$ In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relationship between a UL frame and a DL frame in a wireless communication system to which a method proposed by the disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending of $$n_s^\mu \in \{0, \ldots, N_{subframe}^{slots,\mu} - 1\}$$

in a subframe, and in ascending order of $$n_{s,f}^\mu \in \{0, \ldots, N_{frame}^{slots,\mu} - 1\}$$

in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |

TABLE 2-continued

| | Slot configuration | | | | | |
| --- | --- | --- | --- | --- | --- | --- |
| | 0 | | | 1 | | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 4 | 14 | 160 | 16 | — | — | — |
| 5 | 14 | 320 | 32 | — | — | — |

TABLE 3

| | Slot configuration | | | | | |
| --- | --- | --- | --- | --- | --- | --- |
| | 0 | | | 1 | | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted may be inferred from another channel over which a symbol on the same antenna port is transmitted. When large-scale properties of a channel received over which a symbol on one antenna port may be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the disclosure may be implemented.

Referring to FIG. 3, a resource grid is composed of $$N_{RB}^{\mu} N_{sc}^{RB}$$

subcarriers in a frequency domain, each subframe composed of 14·2μ OFDM symbols, but the disclosure is not limited thereto.

In the NR system, a transmitted signal is described by one or more resource grids, composed of $$N_{RB}^{\mu} N_{sc}^{RB}$$

subcarriers, and $$2^{\mu} N_{symb}^{(\mu)}$$

OFDM symbols. Herein, $$N_{RB}^{\mu} \leq N_{RB}^{max,\mu}.$$

The above $$N_{RB}^{max,\mu}$$

indicates the maximum transmission bandwidth, and it may change not just between numerologies, but between UL and DL.

In this case, as illustrated in FIG. 3, one resource grid may be configured for the numerology μ and an antenna port p.

Each element of the resource grid for the numerology μ and the antenna port p is indicated as a resource element, and may be uniquely identified by an index pair (k,l̄). Herein, $$k = 0, \ldots, N_{RB}^{\mu} N_{sc}^{RB} - 1$$

is an index in the frequency domain, and $$\bar{l} = 0, \ldots, 2^{\mu} N_{symb}^{(\mu)} - 1$$

indicates a location of a symbol in a subframe. To indicate a resource element in a slot, the index pair (k,l) is used. Herein, l=0, . . . , $N_{symb}^{\mu}$−1.

The resource element (k,l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}$=12 continuous subcarriers in the frequency domain. In the frequency domain, physical resource blocks may be numbered from 0 to $N_{RB}^{\mu}$−1. At this point, a relationship between the physical resource block number $n_{PRB}$ and the resource elements (k,l) may be given as i.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}$−1 in the frequency region.

Self-Contained Subframe Structure

FIG. 4 is a diagram illustrating a self-contained subframe structure in a wireless communication system to which the present disclosure may be applied.

In a TDD system, in order to minimize data transmission latency, a self-contained subframe structure, such as that of FIG. 4, is considered in a 5 generation (5G) new RAT.

In FIG. 4, a slashed region (symbol index 0) indicates a downlink (DL) control region, and a dark portion (symbol index 13) indicates an uplink (UL) control region. A region not having a shade may be used for DL data transmission or may be used for UL data transmission. In characteristics of such a structure, DL transmission and UL transmission may be sequentially performed within one subframe, DL data is transmitted in the subframe, and UL ACK/NACK may also be received. As a result, the time taken up to data retransmission when a data transmission error occurs can be reduced, and thus the latency of the delivery of the final data can be minimized.

In such a self-contained subframe structure, there is a need for a time gap for a process of switching, by a base station and a UE, from a transmission mode to a reception mode or a process of switching, by the base station and the UE, from the reception mode to the transmission mode. To this end, in the self-contained subframe structure, some OFDM symbols at timing at which DL switches into UL are configured as a guard period (GP).

Recently, research of multi-carrier modulation (MCM) schemes for visible light communication (VLC) is carried out.

The MCM scheme has advantages of 1) a robust characteristic for a multi-path, 2) a possible single tap equalizer, and 3) robust DC wandering and flickering interference compared to a single carrier modulation (SCM) scheme.

An MCM-based waveform for VLC must satisfy the following two characteristics.

1) It must have only a one dimension (real-value) signal,
2) It must have a unipolar characteristic.

Various MCM schemes that satisfy the two characteristics are present, but may be basically divided into DC-biased optical OFDM (DCO-OFDM), asymmetrically clipped optical OFDM (ACO-OFDM), and pulse-amplitude modulated discrete multi-tone modulation (PAM-DMT). The schemes have different advantages/disadvantages.

DCO-OFDM (DC-Biased Optical OFDM)

The three schemes are briefly described with reference to FIG. 5.

FIG. 5 is a diagram illustrating an example of a modulation symbol subcarrier mapping method in a frequency domain and signals in a time domain for the existing MCM schemes.

Referring to (a) of FIG. 5, in DCO-OFDM, modulated symbols are disposed in a way to become a hermitian symmetric in a subcarrier mapping form.

In this case, a method of disposing modulated symbols in a way to become the hermitian symmetric means that the symbols are disposed in a conjugate form in the mirror symmetric right and left by using a DC subcarrier as a boundary.

In such a hermitian symmetric disposition method, first, a signal is first transformed into a real value signal in the time domain.

Thereafter, the signal transformed into the real value becomes the final unipolar time domain signal by biasing the signal as much as a minimum value in the time domain.

Asymmetrically Clipped Optical OFDM (ACO-OFDM)

Referring to (b) of FIG. 5, in ACO-OFDM, half modulated symbols in DCO-OFDM are disposed to become a hermitian symmetric at given intervals in a subcarrier mapping form.

In such subcarrier mapping, a waveform in the time domain becomes a form of a real value signal and repeatedly appears in a form having an inverted sign.

Furthermore, the final unipolar time domain signal is generated from the waveform that repeatedly appears as described above through zero clipping.

Pulse-Amplitude Modulated Discrete Multi-Tone Modulation (PAM-DMT)

Referring to (c) of FIG. 5, in PAM-DMT, a real value signal is flipped and disposed in an imaginary part based on the middle by using a PAM method in a subcarrier mapping form.

In such subcarrier mapping, in the time domain, a waveform becomes a form of a real value signal, and repeatedly appears in mirror symmetric form having a form having an inverted sign.

The PAM-DMT is a method of generating the final unipolar time domain signal through zero clipping like the ACO-OFDM scheme.

The three MCM schemes described with reference to FIG. 5 have advantages and disadvantages, such as those of Table 4, with respect to performance measures, such as spectral efficiency (SE), the PAPR, a signal-to-noise ratio (SNR), and a bit error rate (BER).

Table 4 is a table illustrating a measure performance comparison between the MCM schemes for VLC.

TABLE 4

|  | SE | SNR | BER |
| --- | --- | --- | --- |
| DCO OFDM | O | X | X |
| ACO OFDM | X | O | O |
| PAM-DMT OFDM | X | O | Δ |

Referring to Table 4, DCO-OFDM has half SE for the hermitian symmetry characteristic, and may be considered as the most optimum SE in unipolar OFDM.

In this case, DCO OFDM has a disadvantage in that the SNR characteristic is degraded because a portion of power carried on a signal among actual transmit power is reduced due to a bias.

In this case, a DC-bias value is a constant value, and does not influence performance when a modulated symbol is detected in a reception stage.

ACO-OFDM has a disadvantage in that it has half SE of DCO OFDM. However, ACO-OFDM has an advantage in that it has a relatively good SNR characteristic because a DC bias is not necessary and transmit power is fully carried on a desired signal.

In general, PAM DMT has the same characteristics as ACO OFDM. However, PAM DMT has a disadvantage in that BER performance is poorer than ACO OFDM because a distance characteristic between symbols is degraded based on amplitude as one dimension rather than using modulation as a quadrature complex symbol.

Hereinafter, a complex DCO (CDCO) OFDM scheme is described as an MCM scheme as VLC proposed in the present disclosure.

VLC has a good possibility that the VLC may enter a new communication standard in the future in a form of a new feature like mmWave in NR due to an advantage in that a wide band can be secured with a very low cost.

The CDCO-OFDM scheme proposed in the present disclosure greatly improves a transmit average power characteristic for satisfying target desired signal power while maintaining optimum spectral efficiency compared to the existing multicarrier system for VLC. Accordingly, there is a good possibility that the CDCO-OFDM scheme will be adopted as a waveform for VLC.

In relation to the CDCO OFDM scheme, (1) a CDCO OFDM waveform design method and a transmission/reception stage structure therefor, (2) analysis of power efficiency of the existing MCM methods and the CDCO-OFDM scheme, (3) a degree of freedom of resource allocation in the CDCO-OFDM scheme, and (4) a multi-stream transmission advantage of the CDCO-OFDM scheme are sequentially described.

"A/B" used in the present disclosure means "A and/or B." "A and/or B" may be interpreted as the same meaning as that "this includes at least one of A or B."

Complex DCO-OFDM (CDCO-OFDM) Waveform

First, a CDCO-OFDM waveform is described.

Unlike the existing method of generating a real value waveform by using a hermitian symmetry characteristic, the CDCO-OFDM scheme proposed in the present disclosure is a method of generating a real value waveform by using partial waveforms of a real part and imaginary part having a complex waveform based on a characteristic in which the waveform is repeated in the time domain.

In the CDCO-OFDM scheme, a modulated symbol is carried on only some or all of even or odd subcarriers among subcarriers of an allocated resource block in the frequency domain.

In such a case, in the form of a waveform in an IFFT output stage, if even subcarriers are used, the same waveform is perfectly repeated. If odd subcarriers are used, the sign of the same waveform is inversed and repeated (refer to FIG. 6).

That is, in the CDCO-OFDM scheme, a half waveform of each of a real part and an imaginary part can be taken and handled in a real domain by using such a characteristic.

Furthermore, unlike in the existing DCO-OFDM scheme, in the CDCO-OFDM scheme, multiple DC-biases may be applied by considering the waveform of each part because the real part and the imaginary part are simultaneously handled in the real domain.

More specifically, if partial waveforms are juxtaposed in parallel by applying multiple DC-biases based on a minimum value of the waveform corresponding to the real part and a minimum value of the waveform corresponding to the (negative value with maximum amplitude) imaginary part, a unipolar real value waveform can be obtained.

Multiple DC-biases do not influence performance because there is an effect in that a real part value of a time domain waveform is biased if a real value is applied to a DC component in the frequency domain and an imaginary part value of the time domain waveform is biased if an imaginary value is applied to the DC component.

FIG. 6 is a diagram illustrating an example of subcarrier mapping in the frequency domain and waveforms in the time domain in the CDCO-OFDM scheme proposed in the present disclosure.

In FIG. 6, PWS means partial waveform selection.

The aforementioned CDCO-OFDM scheme may be described as equations as follows.

First, notation is described before the CDCO-OFDM scheme proposed in the present disclosure is described as the equations.

A regular character indicates a scalar, and a bold character indicates a vector or a matrix.

A blackboard bold character indicates a set.

For example, z, z (Z), and $\mathbb{Z}$ indicate a scalar, a vector (matrix), and a set, respectively. Each of Re(z) and Im(z) indicates a function that takes a real part vector and imaginary part vector of the complex value vector z.

min(z) and abs(z) mean minimum elements of z, and mean amplitude of z.

Furthermore, $|\mathbb{Z}|$ means the cardinality of the set $\mathbb{Z}$, $(\cdot)_L$ indicates an L-modulo operation, and $|\cdot|_1$ means $l_1$-norm.

Furthermore, $(\cdot)^T$ means a transpose operation, and [A; B] means [AB].

A data modulated symbol sequence having a length M of an i-th user is called $X^{(i)}=[X^{(i)}[0], X^{(i)}[1], \ldots, X^{(i)}[M-1]]^T$.

Furthermore, $\mathbb{R}=\{0, 1, \ldots, N-1\}$ indicates all of possible subcarrier sets. A resource set allocated to an i-th user is indicated as $\mathbb{R}^{(i)}$.

This is a partial set of $\mathbb{R}$, and satisfies $|\mathbb{R}^{(i)}|\geq 2M$ and $(|\mathbb{R}^{(i)}|)_2=0$. $\mathbb{R}^{(i)}$ may be divided into $\mathbb{R}_o^{(i)}$ and $\mathbb{R}_e^{(i)}$, $\mathbb{R}_o^{(i)}$ means a subcarrier set on which a modulated symbol will be carried. $\mathbb{R}_e^{(i)}$ means a subcarrier set to be padded.

Furthermore, r(i): $\{0, 1, \ldots, M-1\} \rightarrow \mathbb{R}_o^{(i)}$, and satisfies $r(i) \neq r(j)$ for $i \neq j$ and $(r(i))_2=0$ for $\forall i$ or $(r(i))_2=1$ for $\forall i$.

A data modulated symbol sequence $X^{(i)}$ having the length M produces a frequency domain data modulated symbol sequence $\overline{X}^{(i)}=[\overline{X}^{(i)}[0], \overline{X}^{(i)}[1], \ldots, \overline{X}^{(i)}[N-1]]^T$ having a length N through a subcarrier mapping function, and satisfies Equation 2.

$$\overline{X}^{(i)}[k] = \begin{cases} X^{(i)}[k'], & \text{if } k = r(k') \text{ for } k' \in \{0, 1, \ldots, M-1\} \text{ and } k \in \mathbb{R}_o^{(i)}, \\ 0, & o.w.. \end{cases} \quad \text{[Equation 2]}$$

A time domain waveform of $\overline{X}^{(i)}$ is represented like Equation 3.

$$\overline{x}^{(i)}=\tilde{F}_N\overline{X}^{(i)} \quad \text{[Equation 3]}$$

In this case, $\tilde{F}_N$ is an N×N IFFT matrix, and is given like Equation 4.

$$\tilde{F}_N = \begin{bmatrix} 1 & 1 & 1 & 1 \\ 1 & e^{j\frac{2\pi}{N}} & \ldots & e^{j\frac{2\pi(N-1)}{N}} \\ \vdots & \vdots & \ddots & \vdots \\ 1 & e^{j\frac{2\pi(N-1)}{N}} & \ldots & e^{j\frac{2\pi(N-1)^2}{N}} \end{bmatrix} \quad \text{[Equation 4]}$$

$\overline{x}^{(i)}[t]$ for $t \in \{0, 1, \ldots, N/2-1\}$ satisfies a characteristic of Equation 5 depending on whether $\mathbb{R}_o^{(i)}$ is a set consisting of even subcarriers or a set consisting of odd subcarriers.

$$\overline{x}^{(i)}[t] = \begin{cases} \overline{x}^{(i)}[t+N/2], & \text{if } \mathbb{R}_o^{(i)} \text{ is the set of even subcarriers,} \\ -\overline{x}^{(i)}\left[t+\frac{N}{2}\right], & \text{if } \mathbb{R}_o^{(i)} \text{ is the set of odd subcarriers.} \end{cases} \quad \text{[Equation 5]}$$

Accordingly, a length N unipolar real value waveform $\overline{z}^{(i)}$ of Equation 6 may be obtained from $\overline{x}_p^{(i)}=[\overline{x}^{(i)}[0], \ldots, \overline{x}^{(i)}[N/2-1]]$ having a length N/2 by using a repeated characteristic of $\overline{x}^{(i)}$.

$$\overline{z}^{(i)} = \left[\text{Re}(\overline{x}_p^{(i)}) + b_{re}; \text{Im}(\overline{x}_p^{(i)}) + b_{im}\right] \quad \text{[Equation 6]}$$

In this case, $b_{re}$ and $b_{im}$ mean multiple bias amplitude, and values thereof are determined like Equation 7.

$$b_{re} = |\min(\text{Re}(\bar{x}_p^{(i)}))|_1, \; b_{im} = |\min(\text{Im}(\bar{x}_p^{(i)}))|_1 \qquad \text{[Equation 7]}$$

Such a multi-bias method has an advantage of power efficiency, but a single bias method is also possible like Equation 8 if power efficiency is not an important criterion.

$$\bar{z}^{(i)} = [\text{Re}(\bar{x}_p^{(i)}); \text{Im}(\bar{x}_p^{(i)})] + b \qquad \text{[Equation 8]}$$

In this case, bias amplitude b is determined like Equation 9.

$$b = |\min(\bar{z}^{(i)})|_1 = |\min(\text{Re}(\bar{x}_p^{(i)}), \text{Im}(\bar{x}_p^{(i)}))|_1 \qquad \text{[Equation 9]}$$

In the case of a received signal $\bar{w} = \Sigma_i \bar{z}^{(i)} + n$ (n is additive white Gaussian noise (AWGN)) in which waveforms of multiple users are multiplexed, a signal $\bar{y}$ received in the form of Equation 10 is reconstructed from the received signal.

$$\bar{y} = \begin{cases} [\bar{w}_1 + j\bar{w}_2; \bar{w}_1 + j\bar{w}_2], & \text{if } \square_o^{(i)} \text{ is the set of even subcarriers,} \\ [\bar{w}_1 + j\bar{w}_2; -\bar{w}_1 - j\bar{w}_2], & \text{if } \square_o^{(i)} \text{ is the set of odd subcarriers.} \end{cases} \qquad \text{[Equation 10]}$$

In this case, $\bar{w}_1 = [\bar{w}[0], \ldots, \bar{w}[N/2-1]]^T$, and $\bar{w}_2 = [\bar{w}[N/2], \ldots, \bar{w}[N-1]]^T$. A frequency domain signal of Equation 11 is obtained from the received reconstructed signal $\bar{y}$ in the time domain through an FFT operation.

$$\bar{Y}^{(i)} = F_N \bar{y}^{(i)} \qquad \text{[Equation 11]}$$

In this case, $F_N$ is an N×N FFT matrix, and is given like Equation 12.

$$F_N = \begin{bmatrix} 1 & 1 & 1 & 1 \\ 1 & e^{j\frac{-2\pi}{N}} & \ldots & e^{j\frac{-2\pi(N-1)}{N}} \\ \vdots & \vdots & \ddots & \vdots \\ 1 & e^{j\frac{-2\pi(N-1)}{N}} & \ldots & e^{j\frac{-2\pi(N-1)^2}{N}} \end{bmatrix} \qquad \text{[Equation 12]}$$

A received data modulated symbol sequence $Y^{(i)}$ having a length M of an $i^{th}$ user may be obtained by extracting samples that satisfy the following condition from $\bar{Y}^{(i)}$.

A frequency domain data modulated symbol sequence $X^{(i)} = [X^{(i)}[0], X^{(i)}[1], \ldots, X^{(i)}[N-1]]^T$ having a length N is obtained through a subcarrier mapping function, and satisfies Equation 13.

$$Y^{(i)}[k] = \bar{Y}^{(i)}[k'], \text{ for } r(k) = k' \text{ where } k \in \{0, 1, \ldots, M-1\} \text{ and } k' \in \square_o^{(i)} \qquad \text{[Equation 13]}$$

As described above, the CDCO-OFDM scheme has advantages in that different biases can be applied by considering characteristics of a real part waveform and an imaginary part waveform and transmit energy necessary to provide a desired signal having the same average power is greatly reduced.

Using one repetition characteristic has been described with reference to FIG. 7, but such a method may be applied to a method using a multi-repetition characteristic.

In case that an FFT size is a specific L multiple of a data size, if a modulated symbol is carried on only some of subcarriers whose modulo-L operation condition satisfies 0 or L/2 in some of even subcarriers, the modulated symbol may be represented in a form repeated L times in the time domain, and thus a waveform to which a zero bias is applied by applying zero clipping like ACO-OFDM may be constructed. In this case, Equation 5 is modified like Equation 14.

$$\bar{x}^{(i)}[t] = \begin{cases} \bar{x}^{(i)}\left[t + \frac{kN}{L}\right] \text{ for } t \in \{0, \ldots, N/L - 1\}, k \in \{1, \ldots, L-1\}, \text{ if } (r)_L = 0 \text{ for } \forall r \in \square_o^{(i)}, \\ (-1)^k \bar{x}^{(i)}\left[t + \frac{kN}{L}\right] \text{ for } t \in \left\{0, \ldots, \frac{N}{L} - 1\right\}, k \in \{1, \ldots, L-1\}, \text{ if } (r)_L = L/2 \text{ for } \forall r \in \square_o^{(i)}. \end{cases} \qquad \text{[Equation 14]}$$

Power Efficiency of Complex DCO-OFDM Waveform

Next, power efficiency of the CDCO-OFDM scheme is analyzed through a comparison with the existing MCM scheme.

It is assumed that the same band is used in a given FFT size based on DC subcarriers of all the schemes.

FIG. 7 is a diagram illustrating a performance comparison between CCDFs of transmitted energy depending on an information size given as an FFT size of 1024 with respect to CDCO-OFDM, DCO-OFDM, and ACO-OFDM energy bounds.

That is, FIG. 7 is a diagram illustrating a comparison between distributions of transmit energy necessary to provide a desired signal having the same average power based on an information size in a specific FFT size.

In the ACO-OFDM scheme, the same transmit energy is always transmitted because a bias is not applied, and the ACO-OFDM scheme has the greatest advantage in a power efficiency aspect.

The CDCO-OFDM scheme has an advantage in a efficiency aspect because different biases can be applied to a real part and an imaginary part and there is an effect in that an averagely small bias is applied to a time domain waveform compared to the DCO-OFDM scheme.

Furthermore, in the CDCO-OFDM scheme, it can be seen that if a data size to be transmitted is increased with respect to the same FFT size, a complementary cumulative distribution function (CCDF) of transmit energy becomes poor because a bias value is increased due to the degradation of a PAPR characteristic.

FIG. 8 is a diagram illustrating a performance comparison between CCDFs of transmitted energy depending on an information size of 32 with respect to CDCO-OFDM, DCO-OFDM, and ACO-OFDM energy bounds.

That is, FIG. 8 is a diagram illustrating a comparison between distributions of transmit energy necessary to provide a desired signal having the same average power based on an FFT size in a specific data size.

It can be seen that the CDCO-OFDM scheme has increased energy of about 3 dB because average power is also doubled as the FFT size is doubled.

From FIGS. 7 and 8, it can be seen that energy consumption in CDCO-OFDM is smaller than that in DCO-OFDM. It can be seen that a difference between the energy consumption is about 3 dB and half energy consumption occurs with respect to the same FFT size.

FIG. 9 is a diagram illustrating a performance comparison between CCDFs having a maximum power size given as an FFT size of 1024 and a data size of 400 with respect to CDCO-OFDM and DCO-OFDM.

That is, FIG. 9 is a diagram illustrating a comparison between maximum power amplitude distributions of a transmitted signal when a desired signal having the same average power is provided with respect to a specific data size and an FFT size.

As illustrated in FIG. 9, it can be seen that the CDCO-OFDM scheme has better maximum power amplitude distribution of about 0.3 dB than that of the DCO-OFDM scheme.

Degree of Freedom of the Resource Allocation for Complex DCO-OFDM Waveform

Next, a degree of freedom for CDCO-OFDM resource allocation compared to the existing MCM method is described.

A CDCO-OFDM waveform has an advantage in that a degree of freedom is great compared to other methods in a resource allocation aspect because the hermitian symmetry characteristic is not used.

The DCO-OFDM method is incapable of localized mapping because a mirror symmetric form must be always satisfied based on a DC subcarrier in order to stick to the hermitian symmetry characteristic.

In contrast, the CDCO-OFDM method has not restriction to resource allocation, and thus has an advantage in that resources can be flexibly allocated depending on a wireless channel situation.

For example, in a frequency selective channel environment, the CDCO-OFDM method may generate a frequency flat channel environment through localized resource allocation. However, the DCO-OFDM method is incapable of avoiding the frequency selective channel characteristic because only restricted resource allocation is possible in order to maintain the hermitian symmetry characteristic.

FIG. 10 illustrates an example of a resource allocation comparison between CDCO-OFDM, DCO-OFDM, and ACO-OFDM.

That is, FIG. 10 is a diagram illustrating a comparison between resource allocation combinations of the CDCO-OFDM method and the DCO-OFDM method.

Furthermore, the CDCO-OFDM method has only a condition in which only even subcarriers or odd subcarriers are mapped to an allocated resource upon modulated symbol mapping. In contrast, the DCO-OFDM method has restricted modulated symbol mapping in order to maintain the hermitian symmetry characteristic and a symbol at a mirror symmetric location needs to be present in a conjugate form.

Such a modulated symbol location and a phase rotation restricted condition act as restriction conditions in applying various techniques in order to improve a peak-to-average power ratio (PAPR) characteristic in a transmitter stage.

Multi-Stream Transmission for Complex DCO-OFDM Waveform

Next, an advantage capable of multi-stream transmission using the CDCO-OFDM method compared to the existing MCM scheme is described.

In the CDCO-OFDM method, a modulated symbol is mapped to only a half subcarrier in order to achieve the same SE compared to the DCO-OFDM method.

Accordingly, from a UE viewpoint, if base stations spaced apart are simultaneously accessed and perform the sharing of uplink information through multiple antennas or if a base station transmits downlink information UEs spaced apart from one another, multiple streams can be transmitted by carrying, on each radio frequency (RF) chain, time domain signals generated by performing subcarrier mapping on even subcarriers and odd subcarriers.

FIG. 11 is a flowchart illustrating an example of an operating method of a transmission stage for transmitting a signal, which is proposed in the present disclosure.

First, a transmission stage generates at least one bit as a complex value symbol by using a modulation scheme (S1110).

Furthermore, the transmission stage maps a complex value symbol to subcarriers having an even index or subcarriers having an odd index among subcarriers of at least one configured resource block (RB) (S1120).

Furthermore, the transmission stage performs an inverse fast Fourier transform (IFFT) on subcarriers to which the complex value symbol has been mapped in order to generate a time continuous signal (S1130).

Furthermore, the transmission stage performs a direct current (DC) bias on the time continuous signal (S1140).

The time continuous signal includes a first real part signal and a first imaginary part signal.

Furthermore, prior to step S1150, the transmission stage selects a partial signal in each of the first real part signal and the first imaginary part signal and generates a second real part signal and a second imaginary part signal.

In the partial signal, the part may be ½.

Furthermore, the transmission stage may perform the DC bias by applying a first value and a second value to the second real part signal and the second imaginary part signal, respectively.

The first value may be a minimum value of the second real part signal, and the second value may be a minimum value of the second imaginary part signal.

Furthermore, the transmission stage transmits the DC-biased signal (S1150).

After step S1150, the transmission stage may juxtapose the second real part signal and the second imaginary part signal on which the DC bias has been performed.

Furthermore, the second real part signal and the second imaginary part signal on which the DC bias has been performed may be real value signals.

Furthermore, a method of implementing the method of FIG. 11 in the transmission stage is more specifically described.

The transmission stage for transmitting a signal in a wireless communication system may include a radio frequency (RF) module for transmitting and receiving radio signals and a processor controlling the RF module.

The processor may be configured to generate at least one bit as a complex value symbol by using a modulation scheme, map a complex value symbol to subcarriers having an even index or subcarriers having an odd index among subcarriers of at least one configured resource block (RB), perform an inverse fast Fourier transform (IFFT) on subcarriers to which the complex value symbol has been mapped in order to generate a time continuous signal, perform a direct current (DC) bias on the time continuous signal, and transmit the DC-biased signal.

In this case, the time continuous signal may include a first real part signal and a first imaginary part signal.

Furthermore, the processor may be configured to select a partial signal in each of the first real part signal and the first imaginary part signal and to generate a second real part signal and a second imaginary part signal.

Furthermore, the processor may be configured to perform a DC bias on the second real part signal and the second imaginary part signal by applying a first value and a second value, respectively.

The first value may be a minimum value of the second real part signal, and the second value may be a minimum value of the second imaginary part signal.

Furthermore, the processor may be configured to juxtapose the second real part signal and the second imaginary part signal on which the DC bias has been performed.

FIG. 12 is a flowchart illustrating an example of an operating method of a reception stage for receiving a signal, which is proposed in the present disclosure.

First, the reception stage separates, into a real part signal and an imaginary part signal, a signal received from the outside (S1210).

Furthermore, the reception stage generates a complex value signal by performing repetition or symbol inversion on the real part signal and the imaginary part signal (S1220).

Furthermore, the reception stage performs a fast Fourier transform (FFT) on the complex value signal in order to detect a modulation symbol corresponding at least one bit (S1230).

General Apparatus to which the Present Disclosure May be Applied

FIG. 13 is a diagram illustrating an example of a structure of transmission and reception stages for implementing the CDCO-OFDM method, which is proposed in the present disclosure.

Specifically, in FIG. 13, 1310 indicates a structure of a transmission stage, and 1320 indicates a structure of a reception stage.

The transmission stage 1310 may include a data symbol generator 1311, a subcarrier mapper 1312, an IFFT execution unit 1313, a partial signal selector 1314, a DC bias unit 1315, a juxtaposition unit 1316, and an antenna 1317.

The functions of the elements constituting the transmission stage perform the aforementioned functions and methods.

The reception stage 1320 may include an antenna 1321, a waveform separator 1322, a repetition unit (or a symbol inversion unit) 1323, a complex waveform generator 1324, an FFT execution unit 1325, and a data symbol (or modulation symbol) detector 1326.

The functions of the elements constituting the reception stage perform the aforementioned functions and methods.

FIG. 14 illustrates a block diagram of a wireless communication apparatus to which methods proposed in the present disclosure may be applied.

Referring to FIG. 14, a wireless communication system includes a base station 1410 and a plurality of UEs 1420 disposed within the area of the base station.

The base station and the UE may be represented as a transmission stage and a reception stage, respectively.

The base station includes a processor 1411, a memory 1412, and a radio frequency (RF) module 1413. The processor 1411 implements the functions, processes and/or methods proposed in FIGS. 1 to 12. The layers of a radio interface protocol may be implemented by the processor.

The memory is connected to the processor, and stores various pieces of information for driving the processor. The RF module is connected to the processor, and transmits and/or receives a radio signal.

The UE includes a processor 1421, a memory 1422, and an RF module 1423.

The processor implements the functions, processes and/or methods proposed in FIGS. 1 to 12. The layers of a radio interface protocol may be implemented by the processor. The memory is connected to the processor, and stores various pieces of information for driving the processor. The RF module is connected to the processor, and transmits and/or receives a radio signal.

The memory 1412, 1422 may be positioned inside or outside the processor 1411, 1421 and may be connected to the processor by various well-known means.

Furthermore, the base station and/or the UE may have a single antenna or multiple antennas.

The antenna 1414, 1424 functions to transmit and receive radio signals.

FIG. 15 is another example of a block diagram of a wireless communication apparatus to which methods proposed in the present disclosure may be applied.

Referring to FIG. 15, a wireless communication system includes a base station 1510 and multiple UEs 1520 disposed within the base station region. The base station may be represented as a transmission stage (or transmission apparatus), and the UE may be represented as a reception stage (or reception apparatus), and vice versa. The base station and the UE include processors 1511 and 1521, memories 1514 and 1524, one or more Tx/Rx radio frequency (RF) modules 1515 and 1525, Tx processors 1512 and 1522, Rx processors 1513 and 1523, and antennas 1516 and 1526, respectively. The processor implements the aforementioned functions, processes and/or methods. More specifically, in DL (communication from the base station to the UE), a higher layer packet from a core network is provided to the processor 1511. The processor implements the function of the L2 layer. In DL, the processor provides the UE 1520 with multiplexing between a logical channel and a transport channel and radio resource allocation, and is responsible for signaling toward the UE. The TX processor 1512 implements various signal processing functions for the L1 layer (i.e., physical layer). The signal processing function facilitates forward error correction (FEC) in the UE, and includes coding and interleaving. A coded and modulated symbol is split into parallel streams. Each stream is mapped to an OFDM subcarrier and multiplexed with a reference signal (RS) in the time and/or frequency domain. The streams are combined using an inverse fast Fourier transform (IFFT) to generate a physical channel that carries a time domain OFDMA symbol stream. The OFDM stream is spatially precoded in order to generate multiple spatial streams. Each spatial stream may be provided to a different antenna 1516 through the individual Tx/Rx module (or transceiver 1515). Each Tx/Rx module may modulate an RF carrier into each spatial stream for transmission. In the UE, each Tx/Rx module (or transceiver 1525) receives a signal through each antenna 1526 of each Tx/Rx module. Each Tx/Rx module restores information modulated into the RF carrier and provides the information to the RX processor 1523. The RX processor implements various signal processing functions of the layer 1. The RX processor may perform spatial processing on information in order to restore a given spatial stream toward the UE. If multiple spatial streams are directed toward the UE, they may be combined into a single OFDMA symbol stream by multiple RX processors. The RX processor converts the OFDMA symbol stream from the time domain to the frequency domain by using a fast Fourier transform (FFT). The frequency domain signal includes an individual OFDMA symbol stream for each subcarrier of an OFDM signal. Symbols on each subcarrier and a reference signal are restored and demodulated by determining signal deployment points having the best possibility, which have been transmitted by the base station. Such soft decisions may be based on channel estimation values. The soft decisions are decoded and deinterleaved in order to restore data and a control signal originally transmitted by the base station on a physical channel. A corresponding data and control signal are provided to the processor 1521.

UL (communication from the UE to the base station) is processed by the base station 1510 in a manner similar to that described in relation to the receiver function in the UE 1520. Each Tx/Rx module 1525 receives a signal through each antenna 1526. Each Tx/Rx module provides an RF carrier and information to the RX processor 1523. The processor 1521 may be related to the memory 1524 storing a program code and data. The memory may be referred to as a computer-readable medium.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

An example in which the present disclosure is applied to 3GPP LTE/LTE-A/NR and visible light communication systems has been basically described, but may be applied to various wireless communication systems in addition to the 3GPP LTE/LTE-A/NR and visible light communication systems.

The invention claimed is:

1. A method of transmitting a signal in a wireless communication system, the method performed by a transmission stage comprising:
   generating at least one bit as a complex value symbol by using a modulation scheme;
   mapping the complex value symbol to subcarriers having an even index or subcarriers having an odd index among subcarriers of at least one configured resource block (RB);
   performing an inverse fast Fourier transform (IFFT) on the subcarriers to which the complex value symbol has been mapped in order to generate a time continuous signal including a first real part signal and a first imaginary part signal;
   generating a second real part signal and a second imaginary part signal based on a partial signal in each of the first real part signal and the first imaginary part signal;
   performing a direct current (DC) bias on the time continuous signal based on the second real part signal and the second imaginary part signal; and
   transmitting the DC-biased signal.

2. The method of claim 1,
   wherein performing the DC bias includes applying a first value and a second value to the second real part signal and the second imaginary part signal, respectively.

3. The method of claim 2,
   wherein the first value is a minimum value of the second real part signal, and
   wherein the second value is a minimum value of the second imaginary part signal.

4. The method of claim 2, further comprising juxtaposing the second real part signal and the second imaginary part signal on which the DC bias has been performed.

5. The method of claim 1,
   wherein in the partial signal, the part is ½.

6. The method of claim 4,
   wherein each of the second real part signal and the second imaginary part signal on which the DC bias has been performed is a real value signal.

7. A transmission stage for transmitting a signal in a wireless communication system, comprising:
   a radio frequency (RF) module for transmitting and receiving radio signals; and
   a processor configured to control the RF module, wherein the processor is configured to:
   generate at least one bit as a complex value symbol by using a modulation scheme;
   map the complex value symbol to subcarriers having an even index or subcarriers having an odd index among subcarriers of at least one configured resource block (RB);
   perform an inverse fast Fourier transform (IFFT) on the subcarriers to which the complex value symbol has been mapped in order to generate a time continuous signal including a first real part signal and a first imaginary part signal;

generate a second real part signal and a second imaginary part signal based on a partial signal in each of the first real part signal and the first imaginary part signal;

perform a direct current (DC) bias on the time continuous signal based on the second real part signal and the second imaginary part signal; and transmit the DC-biased signal.

8. The transmission stage of claim 7, wherein the processor is configured to perform the DC bias by applying a first value and a second value to the second real part signal and the second imaginary part signal, respectively.

9. The transmission stage of claim 8, wherein the first value is a minimum value of the second real part signal, and wherein the second value is a minimum value of the second imaginary part signal.

10. The transmission stage of claim 8, wherein the processor is configured to juxtapose the second real part signal and the second imaginary part signal on which the DC bias has been performed.

* * * * *